(12) United States Patent
Wagener

(10) Patent No.: US 7,520,776 B2
(45) Date of Patent: Apr. 21, 2009

(54) DEVICE ADAPTER

(75) Inventor: Hans Wagener, Dietzhölztal (DE)

(73) Assignee: Rittal GmbH & Co. KG, Herborn (DE)

( * ) Notice: Subject to any disclaimer, the term of this patent is extended or adjusted under 35 U.S.C. 154(b) by 63 days.

(21) Appl. No.: 11/667,809

(22) PCT Filed: Feb. 10, 2006

(86) PCT No.: PCT/EP2006/001167

§ 371 (c)(1),
(2), (4) Date: May 15, 2007

(87) PCT Pub. No.: WO2006/094595

PCT Pub. Date: Sep. 14, 2006

(65) Prior Publication Data

US 2008/0002338 A1    Jan. 3, 2008

(30) Foreign Application Priority Data

Mar. 4, 2005 (DE) ......................... 10 2005 009 993

(51) Int. Cl.
*H01R 13/66* (2006.01)
(52) U.S. Cl. ...................................... 439/532
(58) Field of Classification Search ................ 439/352, 439/116, 212, 532; 361/756, 759, 649, 638; 248/220.42, 221.11, 221.12
See application file for complete search history.

(56) References Cited

U.S. PATENT DOCUMENTS

| | | | | |
|---|---|---|---|---|
| 4,387,872 A | * | 6/1983 | Hogue | ............... 248/221.11 |
| 4,916,574 A | * | 4/1990 | Hancock et al. | ............. 361/649 |
| 5,178,555 A | * | 1/1993 | Kilpatrick et al. | ........... 439/215 |
| 6,086,389 A | | 7/2000 | Wagener | |

FOREIGN PATENT DOCUMENTS

| | | |
|---|---|---|
| DE | 298 11 379 U1 | 10/1998 |
| DE | 197 55 848 C2 | 7/2002 |

* cited by examiner

*Primary Examiner*—Phuong K Dinh
(74) *Attorney, Agent, or Firm*—Pauley Petersen & Erickson

(57) ABSTRACT

A device adapter including a base part, the bottom side of which has busbar fixtures to be mounted on and contacted with busbars while the top side thereof supports a mounting device that is removably fixed and has two parallel spaced-apart longitudinal rails for coupling electric devices or house wiring units. In order to keep the design simple while offering variable mounting possibilities, the connecting device includes protruding, hook-type hanging elements which are molded onto the bottom side of the longitudinal rails, which can be vertically inserted into receiving holes that are adjusted thereto and are located on the top side of the base part, and which can be hung on the side of the receiving holes facing away from the top side in the area behind the receiving holes by performing a movement in the longitudinal direction. A releasable locking element can lock the hung position of the longitudinal rails.

18 Claims, 3 Drawing Sheets

DEVICE ADAPTER

BACKGROUND OF THE INVENTION

1. Field of the Invention

This invention relates to a device adapter having a base element, which has on its underside rail receptacles for attaching and making electrical contact with bus bars and supports on its top a attachment device, which is releasably fastened by a connecting device and has two parallel, spaced apart longitudinal strips for the connection with electrical devices or installation units.

2. Discussion of Related Art

A device adapter is taught by German Patent Reference DE 197 55 848 C2. With this known device adapter, longitudinal strips are placed on a top along the long edges of a housing base element and are snapped together with the base element by resilient snap-in tongues formed along the long edges, which protrude downward at the sides. In the snapped-in state, the snap-in tongues lie in recesses cut out of the walls at the long sides. The longitudinal strips each has rows of holes oriented perpendicularly with respect to the top of the base element, by which devices can be connected, possibly by suitable fastening elements. To remove the longitudinal strips, it is necessary to release the snap-in tongues from their engagement position, which is connected with corresponding difficulties.

A device adapter with longitudinal strips fastened laterally along the long sides of a base element is also shown in German Patent Reference DE 298 11 379 U1. A mounting element for connecting devices, which can be shifted in the linear direction, is attached to the longitudinal strips, wherein the connection can also be releasable, but wherein no detailed statements are made.

SUMMARY OF THE INVENTION

One object of this invention is to provide a device adapter of the type mentioned above but with a simple construction and simple handling, that offers variable mounting possibilities.

This object is attained by a device adapter having characteristics described in this specification and the claims. In this connection, the connecting means are protruding hook-like suspension elements formed on the underside of the longitudinal strips, which can be vertically inserted into matched receiving openings on the top of the base element and can be suspended by displacing them in the longitudinal direction in the area behind the receiving openings on their side remote from the top. A releasable arresting element is provided for arresting the longitudinal strips in their suspended position. Thus, the longitudinal strips can be mounted in a simple way on the top of the base element and can also be released.

In one embodiment for production and handling, the suspension elements have end sections projecting in the displacement direction, or the suspension elements have widened end sections and the receiving openings are designed as keyhole-shaped openings oriented in the longitudinal direction. The elongated strips are dependably secured by the arresting element.

In this case those measures contribute to simple handling, wherein the arresting element is designed as a removable peg, which can be plugged or snapped in and can be placed from the top through a matched passage in the respective longitudinal strip into a matched arresting element receptacle, which is aligned in the suspended position. The arresting element can be designed as a snap-in element formed on the longitudinal strip or the base element, which engages a counter-snap-in element on the base element or the longitudinal strip.

If the two longitudinal strips attached or to be attached to the lateral edge areas of the base element are connected with each other by two releasable transverse strips, it is possible to pre-assemble a unit having the two longitudinal strips and the transverse strips and attach it to the base element in a simple manner.

Simple manufacture and handling can be accomplished if the transverse strips have a cross section corresponding to that of the longitudinal strips and have holding legs on the underside of the two end sections, which protrude vertically downward.

Those measures further contribute to simple and rigid mounting, wherein transverse pins, oriented to face each other in matched positions, are formed on the facing insides of the longitudinal strips. The transverse strips have hollow spaces for inserting the transverse pins, at least in their end sections, which extend in their longitudinal direction, are open at the ends and are matched in their cross section to the cross section of the transverse pins.

If in the attached state the two longitudinal strips project with end sections past the front of the base element and a support means is installed in the angular area between the front of the base element and the underside of the longitudinal strip, possibilities for mounting also result on the protruding portion of the longitudinal strips. In this case, stability is increased by the support means.

A simple stable attachment with the help of the support means results if on a side facing the front of the base element, the support means has a holding structure which, in the attached state of the longitudinal strips, is brought into engagement with a support means receptacle which is complementary to it.

In one embodiment for the manipulation of the device adapter, in the installed state an end of a longitudinal strip terminates at a defined distance in front of the respective front side of the base element, and a handle for operating a bolt of the device adapter is arranged in the space of the base element which is left open.

Simple connecting of devices or installation units results if a set-up element for connecting devices or installation units is snapped in on the top of the two parallel, spaced apart longitudinal strips, which bridges the parallel distance, and is displaceable in the linear direction along the longitudinal strips and can be fixed in a selectable position on the longitudinal sides by fastening means.

BRIEF DESCRIPTION OF THE DRAWINGS

This invention is explained in view of exemplary embodiments, making reference to the drawings, wherein.

DETAILED DESCRIPTION OF THE INVENTION

Figure 1:
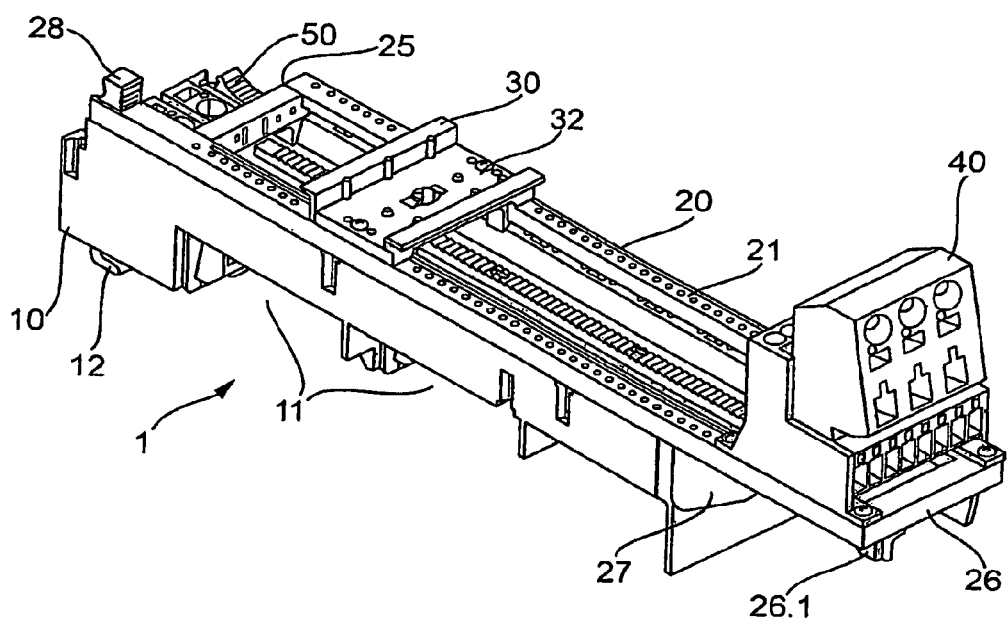
FIG. 1 shows a device adapter with an installed attachment device in a perspective plan view.

FIG. 1 shows a device adapter 1 with a base element 10 and an attachment device 20 received thereon and having two longitudinal strips 21, 24, which are arranged parallel and spaced apart on the longitudinal edges of the base element 10, and transverse strips 25,26 connecting them. A set-up element 30 in the shape of a tophat rail, which bridges the distance between the two longitudinal strips, is placed with its base on the top of the longitudinal strips 21, 24 for simple attachment of devices, or installation units, and is fixed in place on the longitudinal strips 21,24 by fastening device or fastening means 32 in the form of screws, as also shown in FIGS. 2, 3, 5 and 6. Before the set-up element 30 is fixed in its final position, it is fixed in place by downward protruding snap-in holding elements 31 on the longitudinal strips, and can be displaced into the desired position along the longitudinal strips 21,24. In this case, a snap-in lever, not represented, with a snap-in protrusion engages longitudinally extending teeth with inclined and steep flanks, cut into the top of the base element 10, for the temporary arrestment in the displacement position. With screws, which engage holes cut into the longitudinal strips 21, 24 perpendicularly with respect to the top of the attachment device 20, or the device adapter 1, an installation unit in the form of a connecting unit 40 is attached to a section on the top of the longitudinal strips 21,24, which projects past the front of the substantially cube-shaped base element 10. Here, the holes respectively form a row of holes of a defined pattern in the longitudinal strips 21,24.

Figure 4:
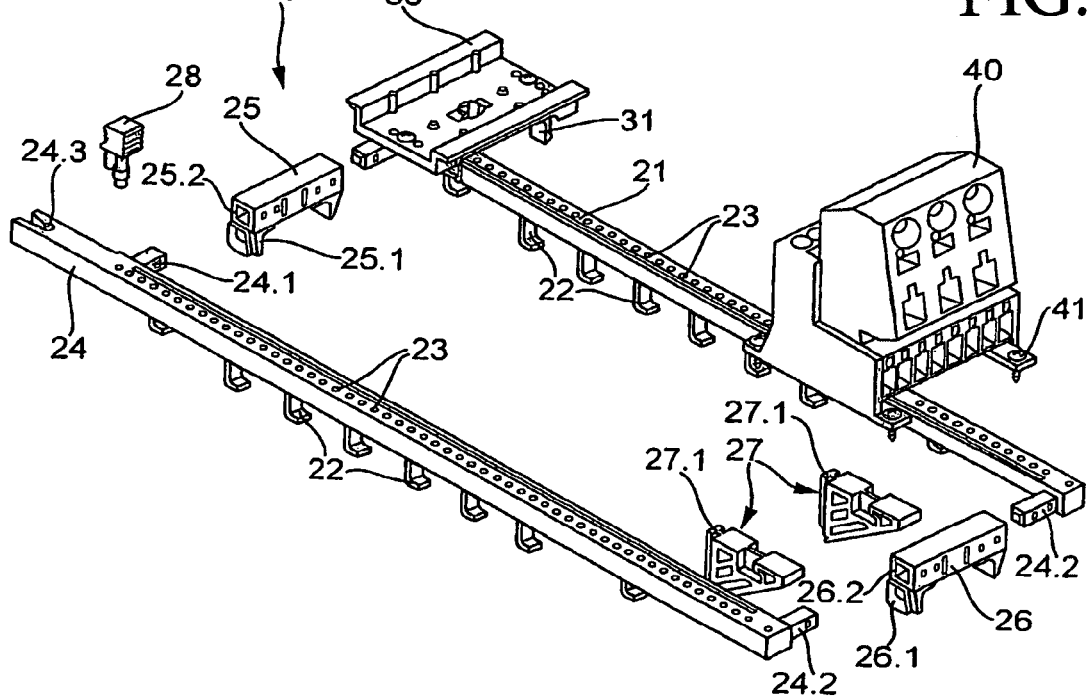
FIG. 4 shows the attachment device in accordance with FIG. 3, in an exploded perspective representation.

As shown in FIGS. 2, 3, 4 and 6, in particular, downward protruding connecting elements in the form of suspension elements 22 are formed on the underside of the attachment device 20, specifically on the underside of the longitudinal strips 21,24. Receiving openings 23,matched to the largest cross section of the suspension elements 22 and whose number and position is matched to the suspension elements 22, are cut into the top of the base element 10 in the vicinity of or near the longitudinal edges. Shoulders are arranged on the underside of the receiving openings 13, behind which the hook-like end sections of the suspension elements 22 extend in the installed state of the attachment device 20. The depth of the receiving openings 13 down to the shoulders is matched to the clear width between the underside of the longitudinal strips 21, 24 and the top of the hook elements. For the installation of the attachment device 20, the longitudinal strips 21 with the suspension elements 22 are inserted perpendicularly with respect to the top of the base element 10 into the receiving openings 13 and are subsequently displaced in the longitudinal direction of the base element 10,so that the hook elements, which also project in the displacement direction, are brought into their holding position. In its holding position, the attachment device 20 is fixed in place against displacement by an arresting element 28 on one longitudinal strip 24 or, alternatively, on both longitudinal strips 21, 24, by a peg-like arresting element 28, wherein the arresting element 28 is engaged, preferably in a snapped-in manner, with a shaft portion and an arresting element receptacle 19 cut at an appropriate position into the top of the base element 10. Thus, as shown in FIG. 4, a passage 24.3 which, in the suspended state of the attachment device 20, is aligned with the arresting element receptacle 19, is cut into the respective longitudinal strip 24. Bores 14 are cut next to the receiving openings 13 into the top of the base element 10, with which either the longitudinal strips 21, 24 can be additionally fixed in place, or other attachment units can be directly fixed on the top of the base element 10.

As FIG. 4 shows, on their facing sides the longitudinal strips 21,24 have transverse pins 24.1, 24.2 which are located and aligned opposite each other for the connection of transverse strips 25, 26. Thus, the transverse strips 25, 26, which advantageously have the same cross section as the longitudinal strips 21, 24, are provided at least in their end sections with hollow spaces 25.2, 26.2, whose cross section is matched to the cross section of the transverse pins 24.1, 24.2. Thus, it is possible to pre-assemble the attachment device 20 prior to its mounting on the base element 10 by a simple plug-in connection, by which the application of the attachment device 20 to the base element 10 can be provided in a simple manner. On their underside, the transverse strips 25, 26 have holding legs 25.1, 26.1 formed on them which, for fixation on the base element 10, can additionally be equipped with snap-in elements and cooperate with counter-holding elements of the base element 10.

As shown in the figures, a right-angled support element 27, triangular in lateral view, is arranged in the angular area between the end sections of the longitudinal strips 21, 24 protruding past the respective front side of the base element 10 and the end wall 18 at the front end of the base element 10, which can have on its side facing the end wall 18 a holding structure 27.1 in the form of a rib formed on it, which is T-shaped or dovetailed in cross section and engages a complementary holding receptacle 15 in the form of an undercut T-groove arranged on the front face of the base element 10. During assembly, the holding structure 27.1 of the support element 27 is first pushed into the holding receptacle 15, and the attachment device 20 is subsequently placed on top and hooked in place. As shown for example in FIG. 2, the connecting unit 40 can also be connected with the support element 27 by fastening screws through the longitudinal strips 21, 24.

Figure 2:
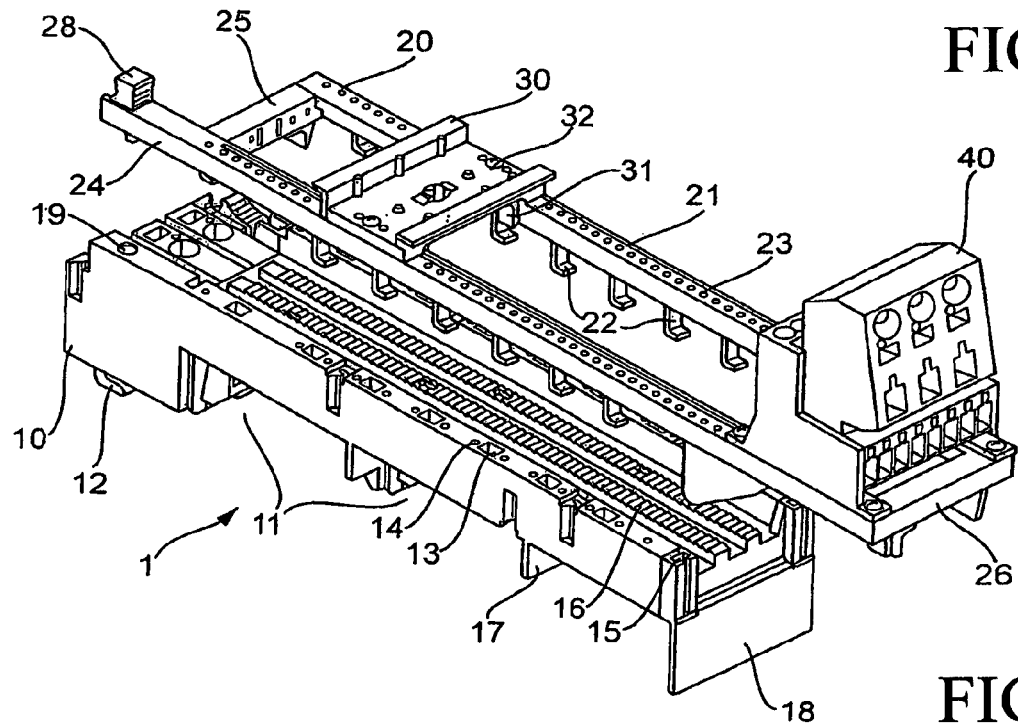
FIG. 2 shows the device adapter in accordance with FIG. 1, with the attachment device removed, in a perspective plan view.
Figure 3:
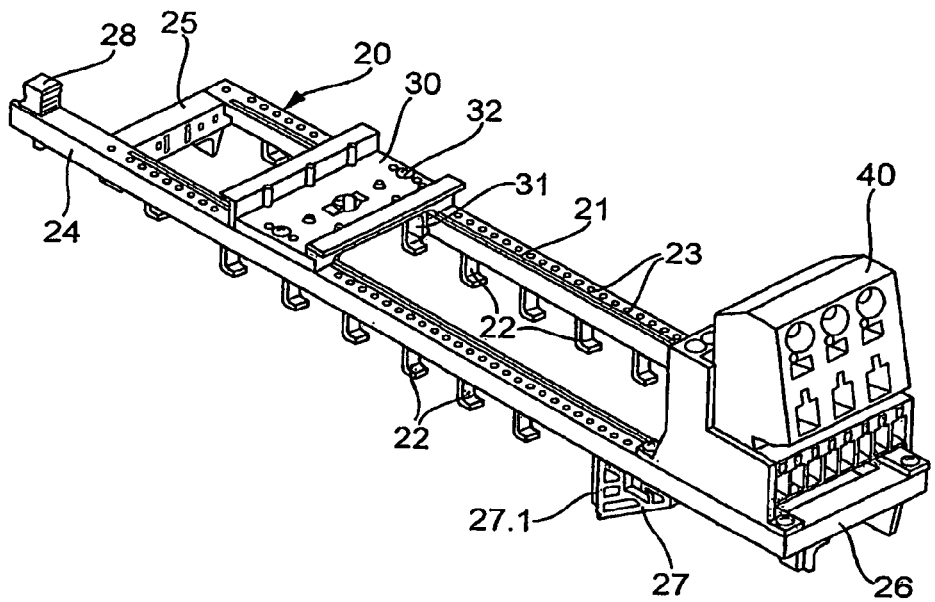
FIG. 3 shows the attachment device represented in FIGS. 1 and 2, in a perspective plan view.
Figure 5:
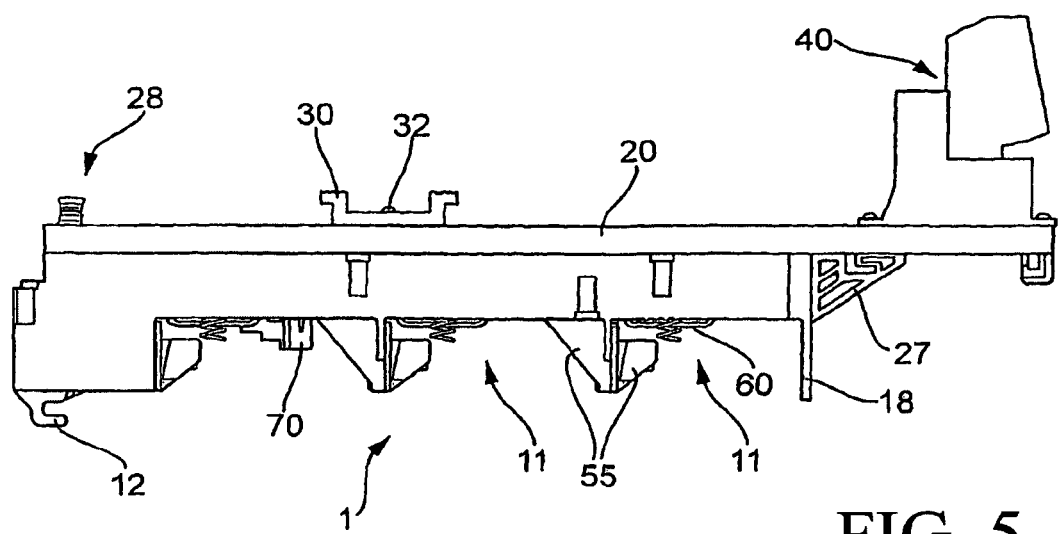
FIG. 5 shows a lateral view of the device adapter in accordance with FIG. 1, with hook elements for attaching bus bars.
Figure 6:
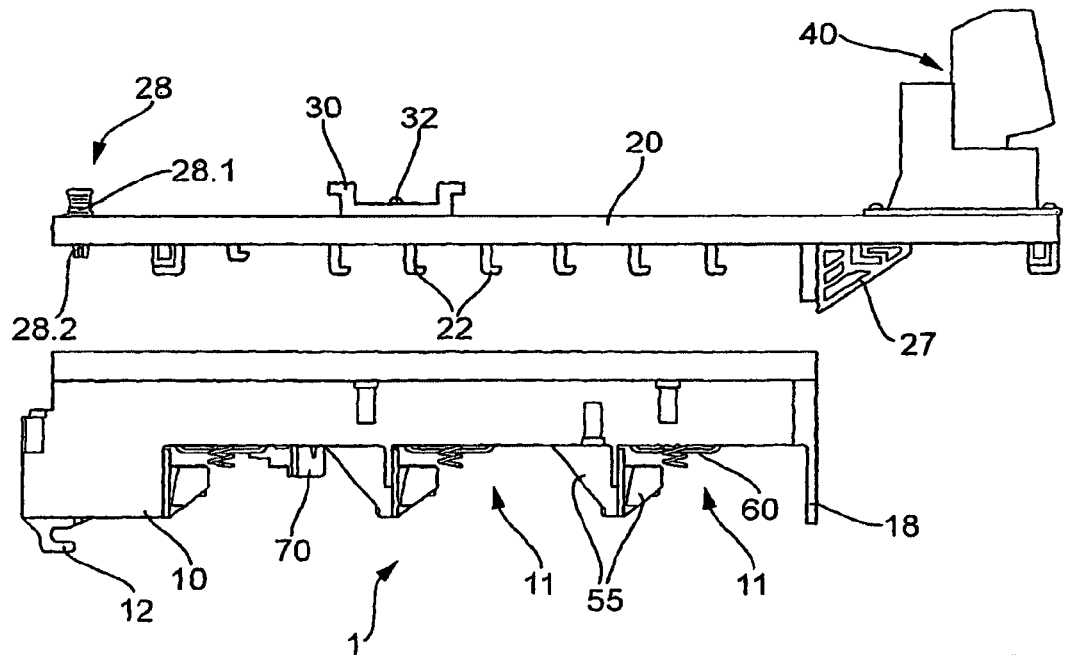
FIG. 6 shows the device adapter in accordance with FIG. 5, with the attachment device removed.

As FIGS. 1 and 2 show, three rail receptacles 11 are formed on the underside of the base element 10, n which bus bars extending transversely to the base element 10, or to the device adapter 1, can be received. The rail receptacles are separated from each other by border walls 17 extending transversely to the base element 10. For making contact with the bus bars, contact sections 60 for making electrical contact with the bus bars are arranged in the rail receptacles 11 on the underside of the base element 10. For attaching the device adapter 1 to the bus bars, hook elements 55 can be fixed on the border walls 17, as shown in FIG. 5. For locking the device adapter 1 attached to the bus bars, a stepped locking element 70, which can be pushed back into the base element 10 against a spring force, is provided in at least one rail receptacle 11, as shown in FIG. 6. The locking element 70 can be unlocked by a handle 50 protruding from an end section on the top of the base element 10, so that the device adapter 1 can be removed from the bus bars. For attachment to a mounting unit, the base element 10 has at least one hook-shaped holding means 12 on the underside of one of its end sections.

In order to operate the handle 50 for the locking element 70 in a simple manner, the one longitudinal strip 21 is shortened at the appropriate end section, so that the handle 50 can be arranged without problems in this area and can be operated.

The invention claimed is:

1. A device adapter having a base element (10) which on an underside has rail receptacles (11) for attaching and making electrical contact with bus bars and supports on a top and an attachment device (20), which is releasably fastened by connecting means and has two parallel spaced apart longitudinal strips (21, 24) for connection with electrical devices or installation units (40), the device adapter comprising:

the connecting means comprising protruding hook suspension elements (22) formed on the underside of the longitudinal strips (21, 24), which are vertically insertable into matched receiving openings (13) on the top of the base element (10) and are suspendible by displacing in a longitudinal direction in an area behind the receiving openings (13) on a side remote from the top, and a releasable arresting element (28) arresting the longitudinal strips (21, 24) in a suspended position.

2. The device adapter in accordance with claim 1, wherein the suspension elements (22) have one of end sections projecting in a displacement direction and have widened end sections, and the receiving openings (22) are designed as keyhole-shaped openings oriented in a longitudinal direction.

3. The device adapter in accordance with claim 2, wherein one of: the arresting element (28) is a removable peg which can be one of plugged and snapped in and can be placed from the top through a matched passage (24.3) in the respective longitudinal strip (24) into a matched arresting element receptacle (19) which is aligned in a suspended position, and the arresting element (28) is a snap-in element formed on one of the longitudinal strip (24) and the base element (10), which engages a counter snap-in element on one of the base element (10) and the longitudinal strip (24).

4. The device adapter in accordance with claim 3, wherein the two longitudinal strips (21, 24) one of attached and to be attached to the lateral edge areas of the base element (10) are connected with each other by two releasable transverse strips (25, 26).

5. The device adapter in accordance with claim 4, wherein the transverse strips (25, 26) have a first cross section corresponding to a second cross section of the longitudinal strips (21, 24) and have holding legs (25.1, 26.1) on an underside of the two end sections which protrude vertically downward.

6. The device adapter in accordance with claim 5, wherein transverse pins (24.1, 24.2) oriented to face each other in matched positions are formed on facing insides of the longitudinal strips (21, 24), and the transverse strips (25, 26) have hollow spaces for inserting the transverse pins (24.1, 24.2) at least in end sections which extend in a second longitudinal direction are open at ends and are matched in cross section to the transverse pins (24.1, 24.2).

7. The device adapter in accordance with claim 6, wherein in an attached state the two longitudinal strips (21, 24) project with end sections beyond the front of the base element (10), and a support (27) is installed in an angular area between a front of the base element (10) and the underside of the longitudinal strip.

8. The device adapter in accordance with claim 7, wherein on a side facing the front of the base element (10), the support (27) has a holding structure (27.1) which in the attached state of the longitudinal strips (21, 24), is engaged with a complementary support means receptacle (15).

9. The device adapter in accordance with claim 8, wherein in the installed state an end of a longitudinal strip (21) terminates at a defined distance in front of the respective front side of the base element (10), and a handle (50) for operating a bolt of a device adapter is arranged in an open space of the base element (10).

10. The device adapter in accordance with claim 9, wherein a set-up element (30) for connecting one of devices and installation units is snapped in on a top of two parallel spaced apart longitudinal strips (21, 24) which bridges a parallel distance and is displaceable in a linear direction along the longitudinal strips (21, 24) and is fixable in a selectable position on the longitudinal sides (21, 24).

11. The device adapter in accordance with claim 1, wherein one of: the arresting element (28) is a removable peg which can be one of plugged and snapped in and can be placed from the top through a matched passage (24.3) in the respective longitudinal strip (24) into a matched arresting element receptacle (19) which is aligned in a suspended position, and the arresting element (28) is a snap-in element formed on one of the longitudinal strip (24) and the base element (10), which engages a counter snap-in element on one of the base element (10) and the longitudinal strip (24).

12. The device adapter in accordance with claim 1, wherein the two longitudinal strips (21, 24) one of attached and to be attached to the lateral edge areas of the base element (10) are connected with each other by two releasable transverse strips (25, 26).

13. The device adapter in accordance with claim 12, wherein the transverse strips (25, 26) have a first cross section corresponding to a second cross section of the longitudinal strips (21, 24) and have holding legs (25.1, 26.1) on an underside of the two end sections which protrude vertically downward.

14. The device adapter in accordance with claim 4, wherein transverse pins (24.1, 24.2) oriented to face each other in matched positions are formed on facing insides of the longitudinal strips (21, 24), and the transverse strips (25, 26) have hollow spaces for inserting the transverse pins (24.1, 24.2) at least in end sections which extend in a second longitudinal direction are open at ends and are matched in cross section to the transverse pins (24.1, 24.2).

15. The device adapter in accordance with claim 1, wherein in an attached state the two longitudinal strips (21, 24) project with end sections beyond the front of the base element (10), and a support (27) is installed in an angular area between a front of the base element (10) and the underside of the longitudinal strip.

16. The device adapter in accordance with claim 15, wherein on a side facing the front of the base element (10), the support (27) has a holding structure (27.1) which in the attached state of the longitudinal strips (21, 24), is engaged with a complementary support means receptacle (15).

17. The device adapter in accordance with claim 1, wherein in the installed state an end of a longitudinal strip (21) terminates at a defined distance in front of the respective front side of the base element (10), and a handle (50) for operating a bolt of a device adapter is arranged in an open space of the base element (10).

18. The device adapter in accordance with claim 1, wherein a set-up element (30) for connecting one of devices and installation units is snapped in on a top of two parallel spaced apart longitudinal strips (21, 24) which bridges a parallel distance and is displaceable in a linear direction along the longitudinal strips (21, 24) and is fixable in a selectable position on the longitudinal sides (21, 24).

* * * * *